(12) United States Patent
Taylor et al.

(10) Patent No.: US 7,376,113 B2
(45) Date of Patent: May 20, 2008

(54) MECHANISM FOR SECURELY EXTENDING A PRIVATE NETWORK

(75) Inventors: John Richard Taylor, Tiburon, CA (US); Pradeep J. Iyer, Cupertino, CA (US); Randy Chou, San Jose, CA (US)

(73) Assignee: Arubs Networks, Inc., Sunnyvale, CA (US)

(*) Notice: Subject to any disclaimer, the term of this patent is extended or adjusted under 35 U.S.C. 154(b) by 369 days.

(21) Appl. No.: 11/096,567

(22) Filed: Apr. 1, 2005

(65) Prior Publication Data
US 2006/0221916 A1  Oct. 5, 2006

(51) Int. Cl.
*H04Q 7/24* (2006.01)

(52) U.S. Cl. ............ 370/338; 370/299; 370/401; 370/467; 370/474; 370/476; 713/151; 713/160; 713/184

(58) Field of Classification Search ............ 370/338, 370/299, 401, 465, 466, 474, 476; 455/410, 455/411; 709/227, 229, 230, 236, 238; 713/184, 713/151, 152, 160
See application file for complete search history.

(56) References Cited

U.S. PATENT DOCUMENTS

| | | | | |
|---|---|---|---|---|
| 6,047,325 A | * | 4/2000 | Jain et al. ............ | 709/227 |
| 6,708,218 B1 | * | 3/2004 | Ellington, Jr. et al. ...... | 709/236 |
| 7,203,195 B2 | * | 4/2007 | Hidaka et al. ............ | 370/392 |
| 2002/0015422 A1 | * | 2/2002 | Inada et al. ............ | 370/474 |
| 2003/0039234 A1 | * | 2/2003 | Sharma et al. ............ | 370/338 |
| 2003/0196105 A1 | * | 10/2003 | Fineberg ............ | 713/200 |
| 2003/0231649 A1 | * | 12/2003 | Awoseyi et al. ............ | 370/463 |
| 2006/0126659 A1 | * | 6/2006 | Baum et al. ............ | 370/466 |

* cited by examiner

*Primary Examiner*—Matthew Anderson
*Assistant Examiner*—Shaima Q. Aminzay
(74) *Attorney, Agent, or Firm*—Blakely, Sokoloff, Taylor & Zafman (57) ABSTRACT

According to one embodiment of the invention, a method for securely extending a private network to include one or more remote access points (APs) comprises a first operation of establishing a secure communication path with a destination device. Then, the information received from a source device is prepared for transmission to the destination device. This involves the received information undergoing Layer 3 (L3) encryption prior to encapsulation into a message for transmission to the destination device if the received information constitutes control information. If the received information constitutes data, the received information optionally undergoes L3 encryption, since the payload data might be already L2 encrypted by the source device, prior to encapsulation into the message.

12 Claims, 4 Drawing Sheets

MECHANISM FOR SECURELY EXTENDING A PRIVATE NETWORK

FIELD

Embodiments of the invention relate to the field of wireless communications, in particular, to a system and apparatus for securely extending a private network to include one or more remote access points.

GENERAL BACKGROUND

Over the last decade or so, companies have installed enterprise networks with one or more local area networks in order to allow their employees access to various network resources. While these networks are typically configured to greatly improve work efficiency for employees physically at work, they tend to provide a lesser level of efficiency for those employees remotely accessing the enterprise network through a virtual private network (VPN).

For example, once a network is configured, employees become quite familiar with the manner in which resources of the network are accessed. This may involve increased familiarity with any graphic user interfaces as well as familiarity with association and authentication procedures. Employees working off-site, however, normally need to associate with different networks and navigate through various non-intuitive VPN client applications designed to form a VPN for accessing network resources from the enterprise network.

As a result, off-site employees access network resources less frequently, which may decrease productivity of these employees. In addition, off-site employees tend to use a greater amount of information technology (IT) resources than other employees, due in part to this lack of a uniform connectivity procedure.

SUMMARY

According to one embodiment of the invention, a method for securely extending a private network comprises (i) establishing a secure communication path with a destination device, and (ii) preparing information received from a source device for transmission to the destination device. The received information undergoes Layer 3 (L3) encryption prior to encapsulation into a message for transmission to the destination device if the received information constitutes control information, and optionally undergoing L3 encryption prior to encapsulation into the message when the received information constitutes data. Moreover, the method further includes preparing information received from a remote connection device by (i) determining when the information received from the remote connection device is destined for a client device and (ii) conducting L3 decryption on the information received from the remote connection device when the information received from the remote connection device is not destined for the client device. The information received from the remote connection device being either management or control information.

BRIEF DESCRIPTION OF THE DRAWINGS

The invention may best be understood by referring to the following description and accompanying drawings that are used to illustrate embodiments of the invention.

DETAILED DESCRIPTION

Embodiments of the invention relate to a system and apparatus for securely extending a private network to include one or more remote access points (APs). According to one embodiment of the invention, a remote AP is configured to set up a secure tunnel to a remote connection device positioned physically inside a location with regulated occupancy (e.g., office, building, etc.). This "remote connection device" may be part of the private network, such as a network switch for example. One type of network switch is a wireless local area network (WLAN) switch if the network features wireless connectivity enhancements to operate as a wireless local area network (WLAN).

More specifically, the remote AP configuration is designed to seamlessly expand the private network (e.g., a WLAN) to the remote AP, allowing a client device to associate with the remote AP and authenticate with resources of the private network just as if the user was physically at the location. The remote AP may be adapted with a second network port to allow a user of the remote AP to alternatively connect to the private network via a wired medium.

In summary, according to one embodiment of the invention, the remote AP sets up a secure communication path by establishing a tunnel in accordance an Open Systems Interconnection (OSI) "Layer 3" (L3) security protocol that protects and authenticates messages between participating devices. One type of L3 security protocol is Internet Protocol Security (IPsec) protocol. For management and control information, IPsec cryptographic operations (e.g., encryption/decryption) are used. For transferred data, however, remote AP allows for optimized performance where no cryptographic operations are performed on the data transmitted through the tunnel. Rather, there is reliance on OSI "Layer 2" (L2) encryption to provide sufficient obfuscation of the data without having to add additional computation complexity through Tripe Data Encryption Standard (3DES) or other encryption schemes.

Herein, according to one embodiment, the invention may be applicable to a variety of wireless networks such as a wireless local area network (WLAN) or wireless personal area network (WPAN). The wireless network may be configured in accordance with any current or future wireless communication protocols. Examples of various types of wireless communication protocols include Institute of Electrical and Electronics Engineers (IEEE) 802.11 standards, High Performance Radio Local Area Networks (HiperLAN) standards, WiMax (IEEE 802.16) and the like. For instance, the IEEE 802.11 standard may an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999); an IEEE 802.11a standard entitled "Wireless LAN Medium Access Control (MAC) and Physical Layer (PHY) specifications: High-Speed Physical Layer in the 5 GHz Band" (IEEE 802.11a, 1999); a revised IEEE 802.11 standard "Wireless LAN Medium Access Control (MAC) and Physical Layer (PHY) specifications" (IEEE 802.11, 1999); or an IEEE 802.11g standard entitled "Wireless LAN Medium Access Control (MAC) and Physical Layer (PHY) specifications: Further Higher Data Rate Extension in the 2.4 GHz Band" (IEEE 802.11g, 2003).

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, "logic" includes hardware and/or software module(s) that are configured to perform one or more functions. For instance, a "processor" is logic that processes information. Examples of a processor include, but are not limited or restricted to a microprocessor, an application specific integrated circuit, a digital signal processor, a micro-controller, a finite state machine, or even combinatorial logic.

A "software module" is executable code such as an operating system, an application, an applet or even a routine. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, a hard drive, etc.), a portable memory device (e.g., floppy diskette, a compact disk "CD", digital versatile disc "DVD", a tape, a Universal Serial Bus "USB" flash drive), or the like.

An "interconnect" is generally defined as a communication pathway established over an information-carrying medium. The interconnect may be a wired interconnect, where the medium is a physical medium (e.g., electrical wire, optical fiber, cable, bus traces, etc.) or a wireless interconnect (e.g., air in combination with wireless signaling technology).

"Information" is defined as data, address, control, management (e.g., statistics) or any combination thereof. For transmission, information may be transmitted as a message, namely a collection of bits in a predetermined format. Different types of messages include a packet, a frame or a cell, each including a header and payload data and having a predetermined number of bits of information.

I. General Network Architecture

Figure 1:
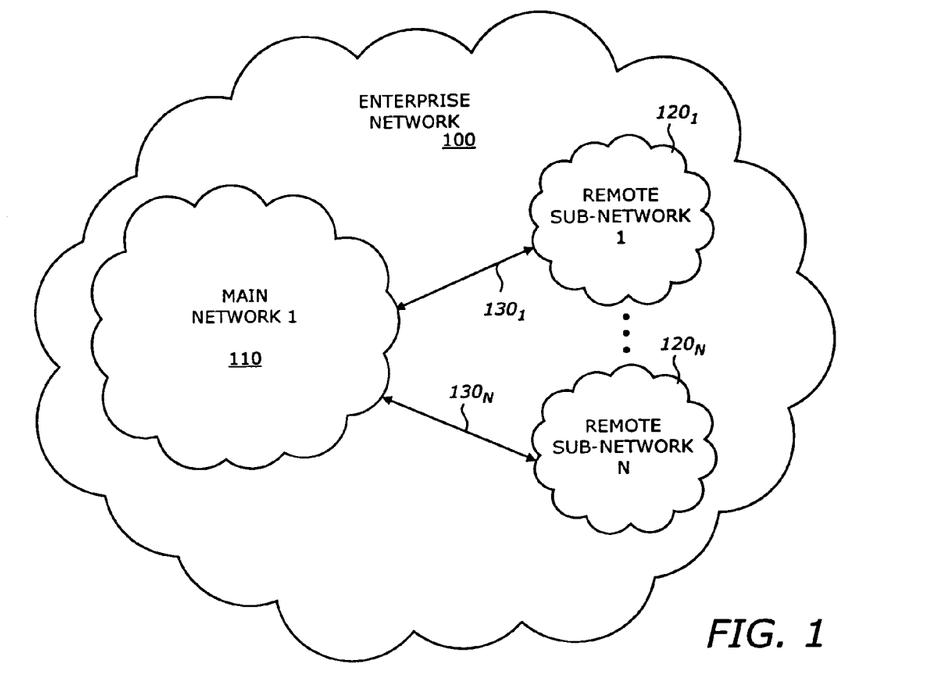
FIG. 1 is an exemplary embodiment of an extended network in accordance with the invention.

Referring to FIG. 1, an exemplary embodiment of an enterprise network 100 is shown. In accordance with one embodiment of the invention, a main network 110 operates as a private network, which includes at least one local area network. The local area network may be adapted with an enhancement that allows remote wireless access, thereby operating as a wireless local area network (WLAN).

One or more remote sub-networks $120_1$-$120_N$ (where $N \geq 1$) are remotely located from main network 110 and are in communication via interconnect 130. According to one embodiment of the invention, peer-to-peer communications are established between main network 110 and remote sub-networks $120_1$-$120_N$ via interconnects $130_1$-$130_N$, respectively. It is contemplated, however, that sub-networks $120_1$-$120_N$ may be in multicast communications with main network 110.

Figure 2:
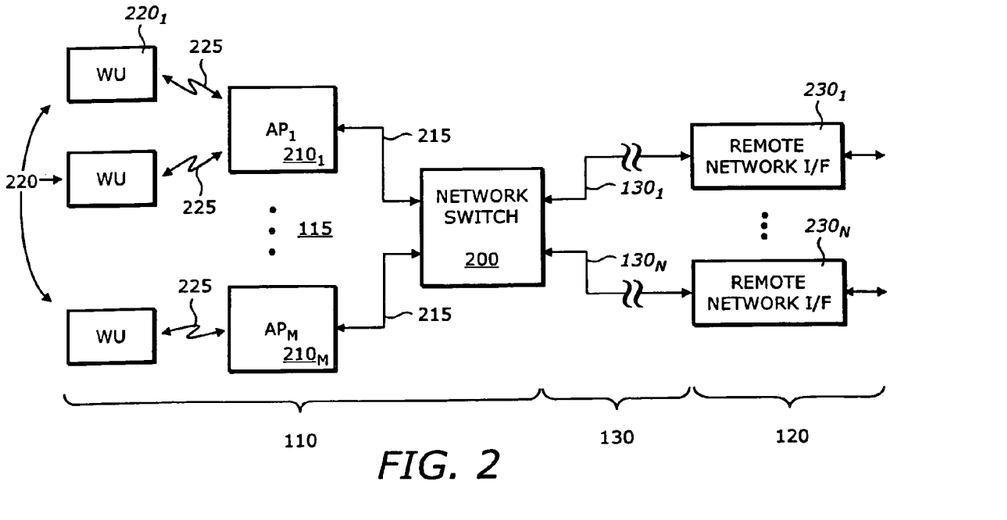
FIG. 2 is a detailed, exemplary embodiment of the network of FIG. 1.

Referring now to FIG. 2, a detailed, exemplary embodiment of enterprise network 100 of FIG. 1 is illustrated. According to this embodiment of the invention, main network 110 features a WLAN 115 that comprises a network switch 200 (e.g., WLAN switch) in communication with one or more access points (APs) $210_1$-$210_M$ (where $M \geq 1$) over an interconnect 215. Interconnect 215 may be established using a wired or wireless information-carrying medium. In addition, one or more wireless units (WUs) 220 are in communication with APs $210_1$-$210_M$ over wireless interconnects 225.

More specifically, each AP $210_1$, ..., or $210_M$ supports bi-directional communications by receiving wireless messages from any or all of the WUs 220 within its coverage area and transferring data extracted from the messages over interconnect 215 to which network switch 200 is coupled.

WUs 220 are adapted to communicate with and access information from any associated AP. For instance, WU $220_1$ is associated with AP $210_1$ and communicates over the air in accordance with a selected wireless communications protocol. Hence, AP $210_1$ generally operates as a transparent bridge connecting together a wireless and wired network.

According to one embodiment, WU $220_1$ comprises a removable, wireless network interface card (NIC) that is separate from or employed within a wireless device that processes information (e.g., computer, personal digital assistant "PDA", telephone, alphanumeric pager, etc.). Normally, the NIC comprises a wireless transceiver, although it is contemplated that the NIC may feature only receive (RX) or transmit (TX) functionality such that only a receiver or transmitter is implemented.

Although not shown, interconnect 215 provides connectivity for network resources such as servers for data storage, web servers or the like. These network resources are available for users of main network 110, albeit access may be restricted.

Network switch 200 comprises logic that supports bi-directional communications with APs $210_1$-$210_M$ over interconnect 215. Namely, network switch 200 receives messages from and transmitting messages to one or more targeted APs $210_1$, ..., or $210_M$ over interconnect 215. According to one embodiment of the invention, interconnect 215 may be part of any type of wired network, including but not limited or restricted to Ethernet, Token Ring, Asynchronous Transfer Mode (ATM), or the like.

Network switch 200 is further adapted to perform L2 & L3 encryption and/or decryption operations on information transferred to or received from one or more remote network interfaces $230_1$-$230_N$. For instance, L2 encryption is conducted on all data messages transmitted over interconnect 130. L3 encryption is optionally conducted for data messages if dual encryption is desired. However, L3 encryption is conducted for all messages generated to route management or control information to the remote AP.

Figure 3:
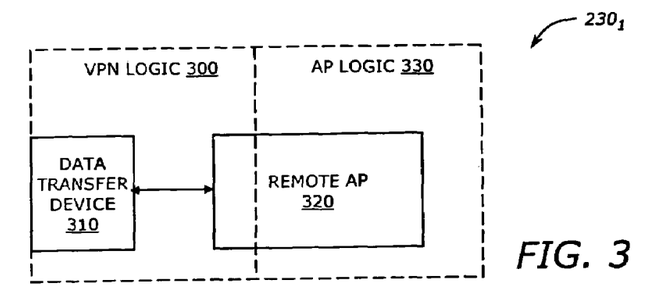
FIG. 3 is an exemplary generalized layout of a remote network interface unit of FIG. 2.

As shown in FIGS. 2 and 3, each remote network interface, such as remote network interface $230_1$ for this illustrative embodiment, includes VPN logic 300 and AP logic 330. VPN logic 300 is used to establish a cryptographically secure communication path to a device, such as establishing an IPsec tunnel to network switch 200 within main network 110. AP logic 330 is used to establish communications with a client device (not shown), which is physically distant from network switch 200, but is utilized by an off-site user to gain access to WLAN 115.

According to one embodiment of the invention, VPN logic 300 features a data transfer device 310 (e.g., a dial-up modem, a broadband modem, a modem/gateway combination) that, in cooperation with a various components of a remote AP 320, establishes a cryptographically secure communication path (e.g., interconnect 130₁) to network switch 200. According to one embodiment of the invention, interconnect 130₁ is a secure tunnel adapted to transfer information through one or more network address translation (NAT) devices to network switch 200. The information is selectively encrypted and decrypted using any L3 cryptographic protocol such as IPsec, Secure Socket Layer (SSL) or other well-known or proprietary cryptographic protocol.

Other components of the remote AP 320, which are represented as AP logic 330, are used to establish a communication path with one or more client devices. Examples of "client devices" include wireless units or any other type of device that processes information (e.g., desktop computer, portable or laptop computer, personal digital assistant "PDA", etc.). The result provides seamless, secure access to main network 110 by the client device.

II. General Architecture of the Remote AP

Figure 4A:
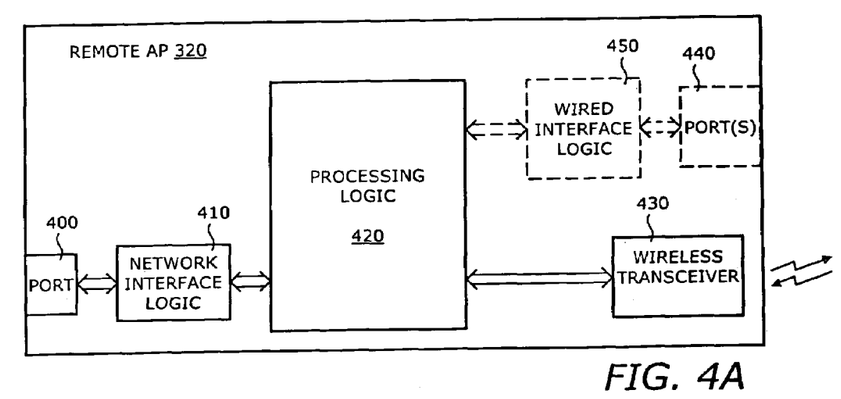
FIG. 4A is a first exemplary embodiment of the remote access point being a part of the remote network interface unit of FIG. 2.

Referring to FIG. 4A, a first exemplary embodiment of remote AP 320 being a part of remote network interface unit 230₁ of FIG. 2 is shown. Remote AP 320 comprises a first port 400, network interface logic 410, a processor 420 and a wireless transceiver 430. As optional features, remote AP 320 may further comprise one or more additional ports 440 (e.g., a second port) and corresponding wired interface logic 450 to support wired communications with a client device in lieu of wireless communications over wireless transceiver 430.

According to this embodiment, first port 400 is adapted for coupling with the data transfer device (not shown), and therefore, enables the receipt of messages from and the transmission of messages to the main network over interconnect 130₁ of FIG. 2. Network interface logic 410 is configured as a combination of hardware and software to control the transmission and receipt of information at the physical (PHY) and data link (MAC) layers (also referred to as "OSI Layer 1 and OSI Layer 2").

Figure 4B:
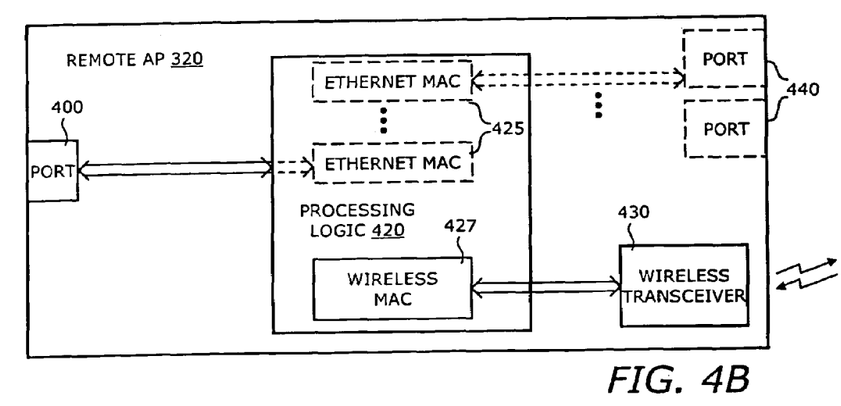
FIG. 4B is a second exemplary embodiment of the remote access point being a part of the remote network interface unit of FIG. 2.

More specifically, according to one embodiment of the invention, as shown in FIG. 4B, network interface logic 410 may be adapted as an Ethernet controller embedded within processor 420 as shown. The Ethernet controller 410 provides Internet connectivity and operates to extract information from incoming messages, which is subsequently processed by other logic within processor 420 according to the operational flow set forth in FIG. 5. The extracted information may include destination, source or intermediary addresses, payload data, management or control information, or the like. Similarly, Ethernet controller 410 is adapted to insert information into outgoing messages as well.

In lieu of an embedded implementation, it is contemplated that network interface logic (or Ethernet controller) 410 may be implemented as a separate integrated circuit with embedded network (Ethernet) functionality placed on a motherboard of remote AP 320. Alternatively, such network (Ethernet) functionality may be achieved by configuring network interface logic (Ethernet controller) 410 as an expansion board that is coupled to the motherboard.

Wireless transceiver 430 comprises an antenna, a power amplifier, and other circuitry to support the radio functionality. More specifically, for one embodiment of the invention supporting IEEE 802.11 communication standards, wireless transceiver 430 comprises an antenna to receive incoming wireless messages. The wireless message(s) include IEEE 802.11 MAC frames encoded and carried within a frequency channel that is located within a carrier frequency band. The carrier frequency band is located within typical radio frequency (RF) band of frequencies. For example, the RF band may generally fall within an approximate range of 2.4-2.5 GHz or perhaps an approximate range of 5-5.25 GHz. It is contemplated, though, that the invention may be applied to any frequency range.

Wireless transceiver 430 isolates the frequency channel on which data is carried from all the other frequencies received on the antenna. This may be accomplished through a tunable filter tuned to a center frequency of a channel of interest. The data channel undergoes a frequency shifting from the carrier band to baseband and the baseband analog radio signal is routed to an analog-to-digital converter (ADC). The ADC samples the baseband analog radio signal and converts it into digital information, which is transferred to processor 420 (e.g., wireless MAC 427) and processed according to the operational flow set forth in FIG. 5. In accordance with FIG. 4B, the digital information may be used to produce messages for transmission via first port 400.

As an optional feature, second port 440 and wired interface logic 450 may be adapted in remote AP 320 to support wired communications with the client device. As shown in FIG. 4B, wired interface logic 450 may be implemented as an Ethernet MAC 425, each associated with one or more ports, and thus, control PHY and MAC messaging as described above. This provides alternative coupling of the client device via wireless or wired interconnect.

III. General Operational Flow

A. Remote AP

Figure 5:
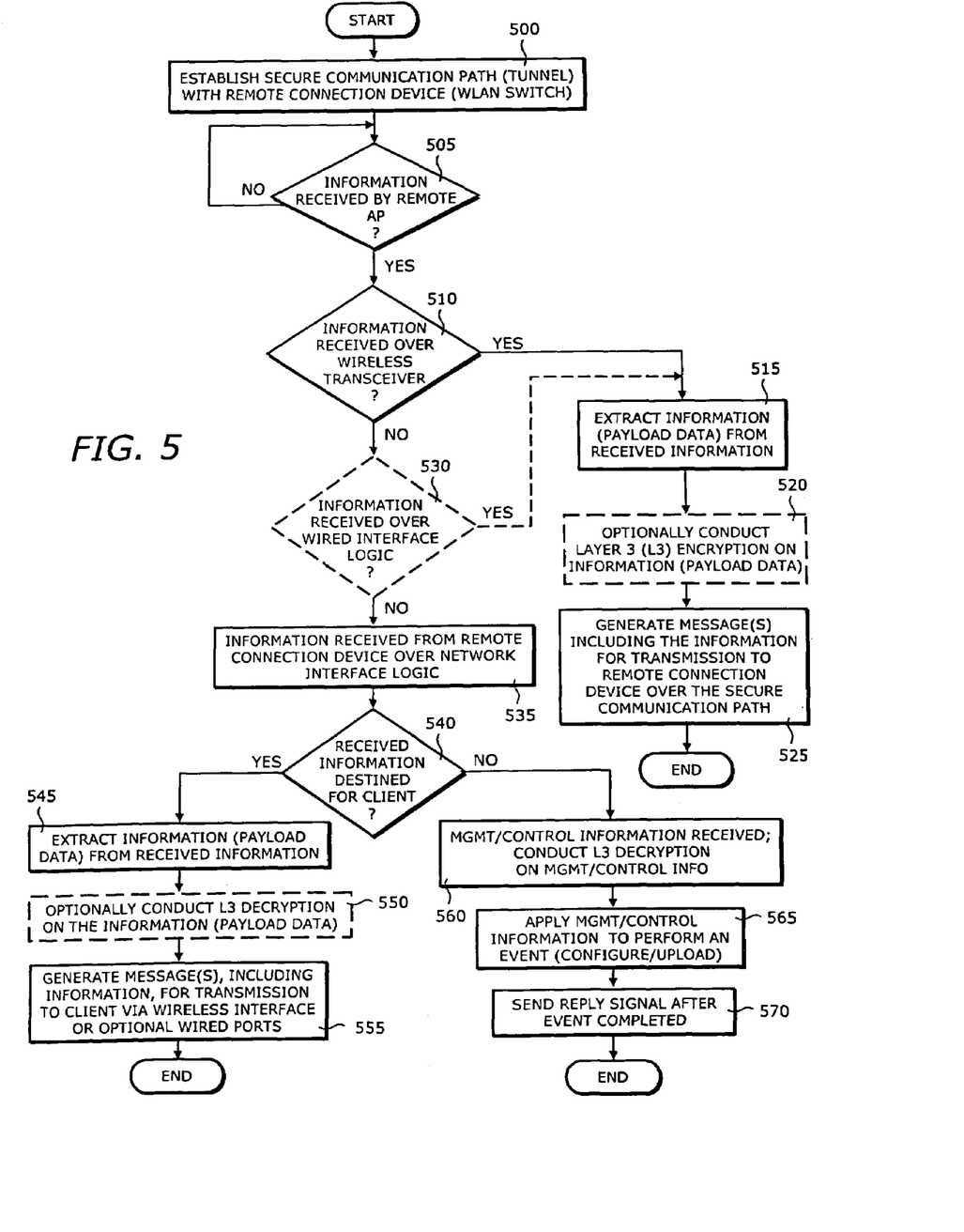
FIG. 5 is an exemplary embodiment of a method of operation for a remote access point of FIGS. 4A & 4B.

Referring now to FIG. 5, an exemplary embodiment of a method of operation for a remote AP implemented within a remote network interface 230ᵢ (1≤i≤N) is shown. A secure communication path is established between the remote AP and a remotely located connection device such as network switch for example (block 500).

Once the remote AP receives information, a determination is made whether the received information is one or more wireless messages from the wireless transceiver (blocks 505 and 510). If so, at least a portion of the received information is extracted from the incoming wireless message(s) and inserted into one or more newly generated messages for transmission to the connection device (block 515 and 525).

If the information to be transferred is management or control information, the extracted information is encrypted using IPsec or another L3 encryption scheme before insertion into the message(s) destined for the connection device. However, if the information constitutes data, the extracted information does not undergo L3 encryption because it might already be encrypted in accordance with L2 WLAN encryption. However, as an optional feature, if dual encryption is desired during network configuration, the payload data may be both L2 and L3 encrypted (block 520).

If the remote AP does not receive information over the wireless transceiver, but instead receives the information from the wired interface logic received by the second port, the same operations set forth above will occur (blocks 515-530). It is noted that payload data might already be encrypted in accordance with a selected L2 encryption scheme, and thus, further L3 encryption of payload data is optional.

In the event that the remote AP receives information, but does not receive information over the wireless transceiver or wired interface logic, the received information may have been received over the secure communication path (block 535). Thereafter, a determination is made whether the received information is management or control information destined for the remote AP or data intended for the client device (block 540).

If the received information is intended for the client device, the remote AP extracts a portion of the received information, such as the payload data for this example (block 545). As an optional feature, the payload data may undergo L3 decryption if the secure communication path (e.g. IPsec tunnel) is configured to conduct L3 encryption on the payload data (block 550). The payload data is inserted into an outgoing message for transmission to the client device (block 555) located behind either the optional wired port(s) or the wireless interface.

When management or control, the extracted information is decrypted using IPsec or the chosen L3 decryption scheme because such information always undergoes encryption prior to transmission through the secure communication path (block 560). The management or control information is uploaded and perhaps processed to reconfigure the remote AP (block 565). Upon successful performance of the desired event (e.g. reconfigure, upload, etc.), a reply signal is generated and returned to the connection device over the secure communication path (block 570).

B. Network Switch

Figure 6:
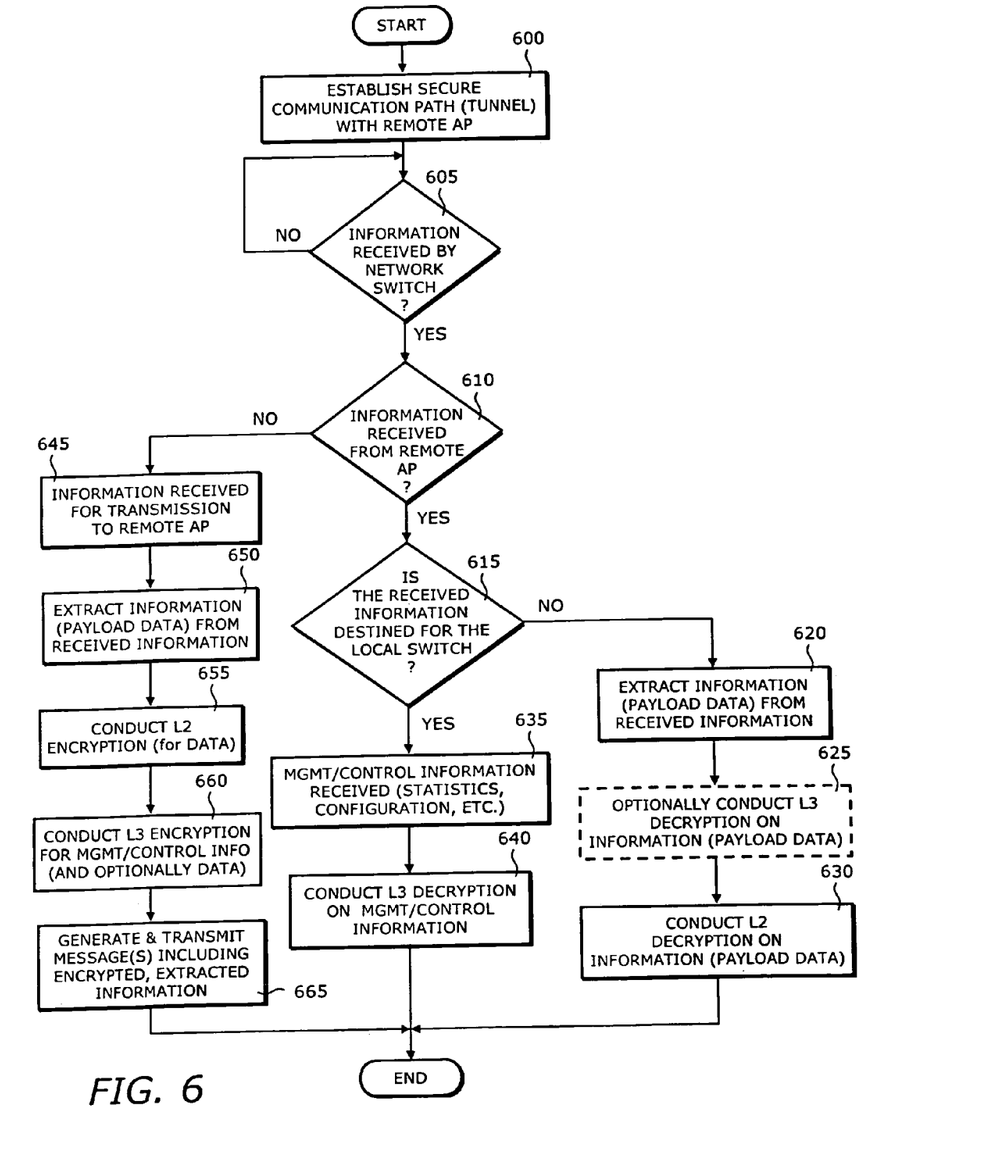
FIG. 6 is an exemplary embodiment of a method of operation for the network switch of FIG. 2.

Referring to FIG. 6, an exemplary embodiment of a method of operation for the network switch in communication with the remote AP is shown. A secure communication path is established with the remote AP (block 600).

Once the network switch receives information, a determination is made whether the received information is from the remote AP or from an AP positioned locally within the private network (blocks 600, 605 and 610). If the received information is from the remote AP, as shown in block 615, a secondary determination is made whether the received information is destined for either (1) the network switch itself, or (2) any other device except the network switch (e.g., a local AP or wireless unit).

If the received information is destined for a local AP or wireless unit, at least a portion of the received information (e.g., payload data) is extracted from the incoming message(s) and decrypted according to a selected L2 decryption protocol (blocks 620 and 630). As an optional feature, some of the extracted information may be decrypted according to a selected L3 decryption protocol if dual encryption is conducted, namely L3 encryption was conducted on the portion of the received information prior to transmission over the secure communication path (block 625).

If the received information is management or control information, the extracted information is decrypted using IPsec or another L3 encryption scheme before being processed (blocks 635 and 640).

If the received information is not provided via the secure communication path, the information must have been received from any device in the main network 110 of FIG. 1, such as a local AP where the information originated from a wireless unit in communication with the local AP (block 645). Thereafter, at least a portion of the received information (e.g., payload data) is extracted from the incoming message(s) and is encrypted according to a selected L2 encryption protocol (blocks 650 and 655). If the extracted information is management or control information, the extracted information is encrypted according to a selected L3 decryption protocol utilized by the secure communication path. Where dual encryption is desired for the payload data, as an optional feature, the payload data may undergoes an optional L3 encryption operation prior to generating one or more messages for transmission over the secure communication path (block 660 and 665).

While the invention has been described in terms of several embodiments, the invention should not be limited to only those embodiments described, but can be practiced with modification and alteration within the spirit and scope of the appended claims. The description is thus to be regarded as illustrative instead of limiting.

What is claimed is:

1. A method comprising:
   establishing a secure communication path with a destination device; and
   preparing information received from a source device for transmission to the destination device, the received information (i) undergoing Layer 3 (L3) encryption prior to encapsulation into a message for transmission to the destination device if the received information constitutes control information, and (ii) optionally undergoing L3 encryption prior to encapsulation into the message when the received information constitutes data; and
   preparing information received from a remote connection device by (i) determining when the information received from the remote connection device is destined for a client device and (ii) conducting L3 decryption on the information received from the remote connection device when the information received from the remote connection device is not destined for the client device, the information received from the remote connection device being either management or control information.

2. The method of claim 1, wherein the destination device is the remote connection device being an Ethernet switch.

3. The method of claim 1, wherein the preparing of the received information further undergoes L3 encryption prior to encapsulation into the message when the received information constitutes management information.

4. The method of claim 1, wherein the preparing of the received information constituting data is encapsulated without undergoing L3 encryption since the data has undergone Layer 2 (L2) encryption by the source device.

5. The method of claim 1 further comprising
   receiving information destined for the client device;
   extracting a portion of the information;
   optionally conducting L3 decryption of the portion of information; and
   generating a message including the portion of the information for transmission to the client device.

6. The method of claim 1, wherein the L3 encryption is in accordance with Internet Protocol Security (IPsec).

7. The method of claim 1, wherein the preparing of information received from the remote communication device further comprises (iii) extracting and optionally conducting L3 decryption on the information when the information received from the remote communication device is destined for the client device.

8. The method of claim 1 further comprising applying the management or control information to perform an event.

9. The method of claim 8 further comprising sending a reply signal after the event has been completed.

10. In communication with a remote connection device, a remote network interface comprising:
    a data transfer device; and
    a remote access point adapted to operate with the data transfer device to establish a secure communication path in accordance a Layer 3 (L3) security protocol with the remote connection device, the remote access point being configured to perform L3 cryptographic operations on received management information and control information and configured to optionally perform L3 cryptographic operations on received data, the remote access point comprises:
- a wireless transceiver adapted to support communications with a client device,
- at least one wired port adapted to alternatively support communications with the client device,
- a port adapted to support communications with the remote connection device, and
- a processor coupled to the wireless transceiver, the at least one wired port and the port, processor including (i) a plurality of Ethernet media access controllers (MACs), each of the Ethernet MACs uniquely coupled to one of a group including the port and the at least one wired port, and (ii) a wireless MAC coupled to the wireless transceiver.

11. The remote network interface of claim 10, wherein the data transfer device is a modem.

12. The remote network interface of claim 10, wherein the remote access point configured to perform L3 cryptographic operations on the received management information and control information and refraining from performing L3 cryptographic operations on received data when the data is already Layer 2 (L2) encrypted.

* * * * *

UNITED STATES PATENT AND TRADEMARK OFFICE
CERTIFICATE OF CORRECTION

PATENT NO. : 7,376,113 B2 Page 1 of 1
APPLICATION NO. : 11/096567
DATED : May 20, 2008
INVENTOR(S) : Taylor et al.

It is certified that error appears in the above-identified patent and that said Letters Patent is hereby corrected as shown below:

Title Page
In (73), at line 1, delete "Arubs" and insert --Aruba--.

In column 9, at line 13, after "port," insert --the--.

Signed and Sealed this

Nineteenth Day of August, 2008

JON W. DUDAS
*Director of the United States Patent and Trademark Office*